US010253464B2

United States Patent
Lawson et al.

(10) Patent No.: US 10,253,464 B2
(45) Date of Patent: Apr. 9, 2019

(54) GANGWAY HAVING POSITION LOCKING ASSEMBLY

(71) Applicant: Safe Rack LLC, Andrews, SC (US)

(72) Inventors: John Rutledge Lawson, Chapin, SC (US); James Pearce Daniel, III, Moncks Corner, SC (US)

(73) Assignee: Safe Rack, LLC, Andrews, SC (US)

( * ) Notice: Subject to any disclaimer, the term of this patent is extended or adjusted under 35 U.S.C. 154(b) by 0 days.

(21) Appl. No.: 15/217,320

(22) Filed: Jul. 22, 2016

(65) Prior Publication Data
US 2017/0030034 A1    Feb. 2, 2017

Related U.S. Application Data

(60) Provisional application No. 62/195,679, filed on Jul. 22, 2015.

(51) Int. Cl.
| *E01D 15/00* | (2006.01) |
| *E01D 18/00* | (2006.01) |
| *B60R 3/00* | (2006.01) |

(52) U.S. Cl.
CPC ............. *E01D 15/00* (2013.01); *B60R 3/005* (2013.01); *E01D 18/00* (2013.01)

(58) Field of Classification Search
CPC .......... E01D 15/00; E01D 18/00; B60R 3/005
USPC ................................................ 14/69.5–71.5
See application file for complete search history.

(56) References Cited

U.S. PATENT DOCUMENTS

| 2,974,336 | A | * | 3/1961 | Kelley | ............... | B65G 69/2841 |
| | | | | | | 14/71.3 |
| 3,699,599 | A | * | 10/1972 | Lapham | ............. | B65G 69/2852 |
| | | | | | | 14/71.3 |
| 3,705,610 | A | | 12/1972 | Baudras | | |
| 4,703,534 | A | * | 11/1987 | Pedersen | ............ | B65G 69/2841 |
| | | | | | | 14/71.1 |
| 7,950,095 | B2 | | 5/2011 | Honeycutt et al. | | |
| 8,387,191 | B2 | | 3/2013 | Honeycutt | | |
| 8,479,884 | B2 | | 7/2013 | Mizell et al. | | |
| 8,745,799 | B1 | | 6/2014 | Thomasson et al. | | |
| 9,050,229 | B1 | | 6/2015 | Morris et al. | | |
| 9,567,759 | B2 | | 2/2017 | Mizell et al. | | |
| 2001/0034915 | A1 | * | 11/2001 | Preston | ............. | B65G 69/2894 |
| | | | | | | 14/71.1 |
| 2007/0101516 | A1 | * | 5/2007 | Carrigan | ................. | E01D 15/24 |
| | | | | | | 14/69.5 |
| 2011/0047723 | A1 | | 3/2011 | Fleischer et al. | | |
| 2012/0006619 | A1 | | 1/2012 | DuBose et al. | | |
| 2013/0047352 | A1 | * | 2/2013 | Corfield | ................. | B64F 1/315 |
| | | | | | | 14/69.5 |
| 2017/0101791 | A1 | | 4/2017 | Harmon | | |
| 2017/0146035 | A1 | | 5/2017 | Afshari | | |

(Continued)

OTHER PUBLICATIONS

Non-Final Office Action dated Mar. 7, 2018 in co-pending U.S. Appl. No. 15/416,562, all enclosed pages cited.

*Primary Examiner* — Raymond W Addie
(74) *Attorney, Agent, or Firm* — Nelson Mullins Riley & Scarborough, LLP

(57) ABSTRACT

A gangway comprises a fixed platform and a support structure. The support structure is connected to the fixed platform in a manner that allows the support structure to rotate with respect to the fixed platform. A releasable position locking assembly inhibits rotation of the support structure in a raising direction.

22 Claims, 5 Drawing Sheets

(56) References Cited

U.S. PATENT DOCUMENTS

| | | |
|---|---|---|
| 2017/0340493 A1 | 11/2017 | Sidhu et al. |
| 2018/0134220 A1* | 5/2018 | Beard ........................ B60R 3/02 |

* cited by examiner

GANGWAY HAVING POSITION LOCKING ASSEMBLY

PRIORITY CLAIM

This application is based upon and claims priority to U.S. provisional patent application Ser. No. 62/195,679, filed Jul. 22, 2015, which is entitled "Gangway Having Position Locking Assembly."

FIELD OF THE INVENTION

The present invention relates to fall restraint equipment, and more particularly, to a gangway having a position locking assembly.

BACKGROUND OF THE INVENTION

Fall restraint equipment, such as gangways, may comprise platforms, ramps, bridges, steps, guardrails, and other support structures. Gangways may be used to provide access to an area, such as the top of a storage container. For example, a semi-trailer truck or a railroad carriage transporting dry goods may need to be unloaded from the container's top. A gangway is used to provide workers a path to unload the material.

SUMMARY OF THE INVENTION

The present invention recognizes and addresses the foregoing considerations, and others, of prior art construction and methods.

In this regard, one aspect of the present invention provides a gangway comprising a fixed platform and a support structure. The support structure is connected to the fixed platform in a manner that allows the support structure to rotate with respect to the fixed platform. A releasable position locking assembly inhibits rotation of the support structure in a raising direction. In a preferred embodiment, the releasable position locking assembly permits rotation of the support structure in a lowering direction.

The position locking assembly may comprise a pawl that engages an arcuate ratchet. For example, the pawl may be urged into engagement with the arcuate ratchet via a spring. In this embodiment, the spring may be connected between a fixed structure and a pivotal foot lock. The pawl may also be connected to the pivotal foot lock via a linkage.

In a preferred embodiment, the arcuate ratchet may comprise a ratchet wheel coaxial with an axis of rotation of the support structure. For example, the ratchet wheel may be located around a bearing.

According to another aspect, the present invention provides a releasable position locking assembly for a gangway having a support structure pivotal with respect to a platform about an axis of rotation. The assembly comprises a ratchet wheel coaxial with the axis of rotation of the support structure. A pawl engages teeth located on an outer circumference of the ratchet wheel so as to inhibit rotation of the support structure in a raising direction but permitting rotation of the support structure in a lowering direction. The pawl is movable out of engagement with the teeth so as to permit rotation of the support structure in a raising direction.

A further aspect of the invention provides a releasable position locking assembly for a gangway having a support structure pivotal with respect to a platform about an axis of rotation. The assembly comprises a ratchet situated adjacent to the axis of rotation of the support structure. A pawl engages teeth located on the ratchet so as to inhibit rotation of the support structure in a raising direction but permitting rotation of the support structure in a lowering direction. The pawl is movable out of engagement with the teeth so as to permit rotation of the support structure in a raising direction.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
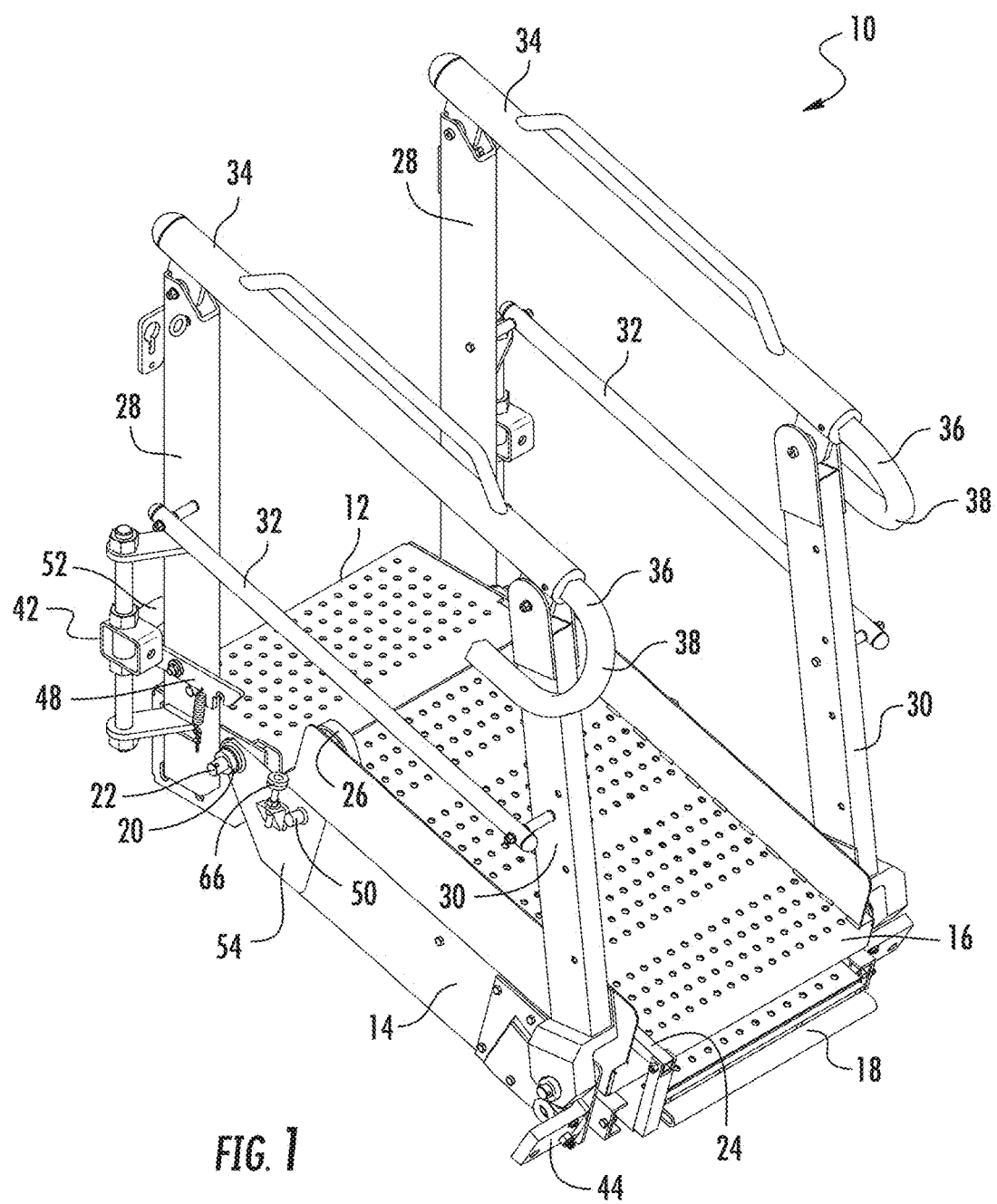
FIG. 1 is a perspective view of a gangway with which a position locking assembly in accordance with the present invention may be used.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Examples of gangways, their components, and associated fall restraint equipment are set forth in U.S. Pat. No. 7,950,095 (entitled "Gangway and Method for Manufacturing Same") and U.S. Pat. No. 8,387,191 (entitled "Gangway Bearing Retainer Plate"), both of which are incorporated fully herein by reference for all purposes.

FIG. 1 illustrates a gangway 10 in accordance with an embodiment of the present invention. As shown, gangway 10 comprises a fixed portion 12 (e.g., a step or platform) and a pivotal support structure 14. In this embodiment, support structure 14 carries a first ramp 16 and a telescoping ramp 18. In particular, first ramp 16 is connected to support structure 14, which is pivotally connected to fixed portion 12. By "fixed," it is meant that support structure 14 moves with respect to portion 12, since the entire gangway 10 might be movable depending on how it is installed. Moreover, while support structure 14 carries one or more ramps in this case, embodiments are contemplated in which self-leveling stairs are used in lieu of a ramp. Moreover, even if a ramp is used, it may not be necessary or desirable in some cases to also provide a telescoping ramp.

As noted, in this embodiment, support structure 14 and ramp 16 pivotally rotate relative to fixed portion 12. In this embodiment, for instance, support structure 14 defines an aperture near its proximal end in which a bearing 20 has been inserted. A rod 22 passing through the aperture (and thus bearing 20) connects support structure 14 to fixed portion 12. As a result, support structure 14 and, thus ramps 16 and 18, may pivot or rotate with respect to fixed portion 12 about an axis defined by rod 22. Fixed portion 12 may be connected to another platform, a stairwell, or other structure depending on the intended use. It should be understood that support structure 14 comprises another bearing similar to bearing 20 located on the side of the support structure opposite the illustrated side. The additional bearing connects the opposite side of support structure 14 to the opposite side of fixed portion 12.

Telescoping ramp 18 is located in a space defined between ramp 16 and support structure 14, and is configured to slideably extend outward from, and retract underneath, ramp 16. In this embodiment, telescoping ramp 18 includes a pivotal arm 24 used to maintain the ramp in a desired position, as explained more fully below. Arm 24 is pivotally connected at its proximal end 40 to the end of ramp 18 that is exposed when ramp 18 is fully retracted. A handle 26 is located at the distal end of arm 24 for lifting by a user.

Gangway 10 may include several other components, such as uprights 28 and 30, midrails 32, and handrails 34. In this embodiment, handrails 34 may also include retractable segments 36 capable of retracting within, and extending out from, the handrails. As shown, retractable segments 36 may terminate in hook-shaped portions 38, which can be attached to the relevant storage container (or a structure connected to the relevant storage container) in order to provide additional stability to gangway 10 during its use. Additionally, two counterbalanced springs may be provided on each side of gangway 10 to facilitate the pivoting of support structure 14 with respect to fixed portion 12. In this regard, each such spring (one of which is shown partially in FIG. 5 at 40) may extend between a respective outrigger 42 attached to each upright 28 and a respective mount 44 located at the distal end of support structure 14.

In addition, as one skilled in the art will appreciate, heavy-duty chains (one of which is shown partially in FIG. 4 at 46) may also be attached to mounts 44. The chains can be locked with respect to uprights 28 to prevent further lowering of support structure 14 when the desired location is reached. In addition, the chains can be pulled to raise support structure 14 into its upward, stowed position when not in use. In this regard, gangway 10 further comprises a spring-loaded pivotal foot lock 48 that engages a foot lock stud 50 to maintain support structure 14 (and thus ramps 16 and 18) in the stowed position. A pedal 52 is located at the end of foot lock 48 opposite to the end that engages stud 50. The operation of foot lock 48 will be described more fully below with respect to FIG. 3.

Figure 2:
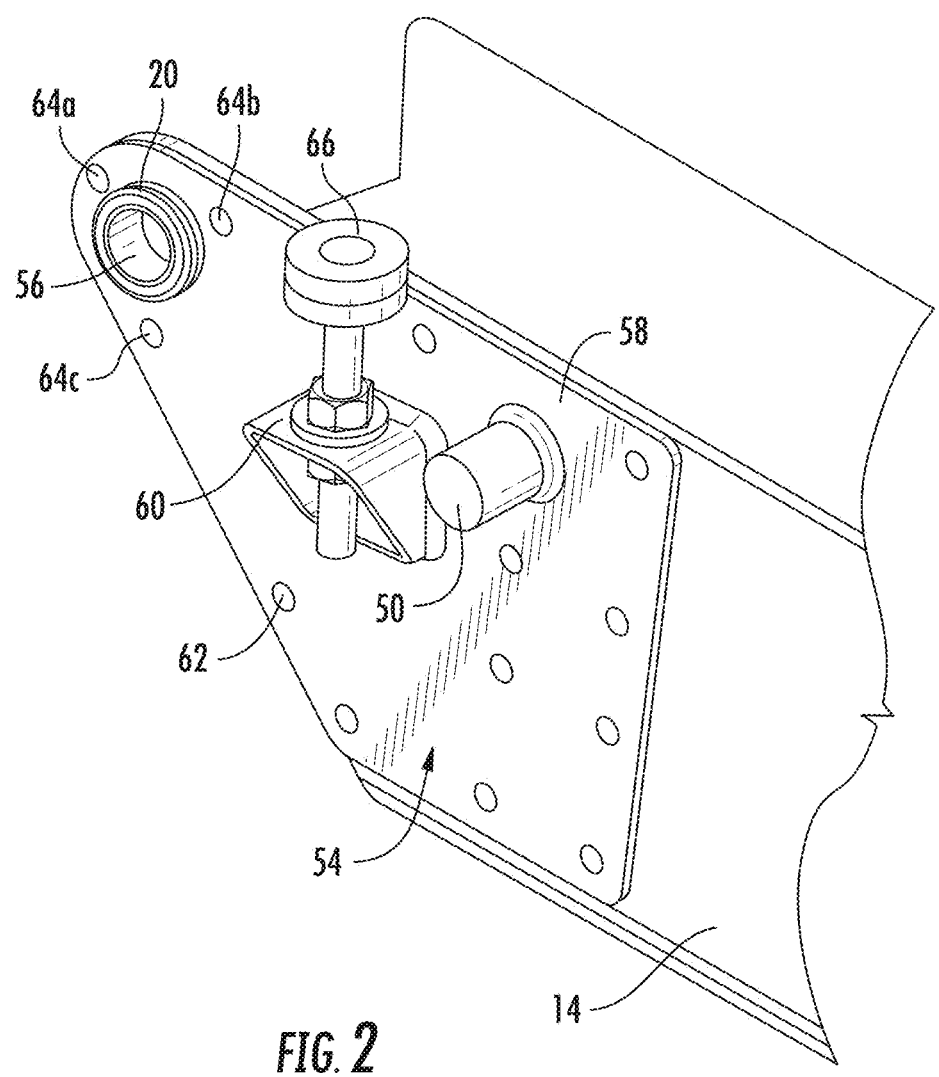
FIG. 2 is an enlarged perspective view showing a pivotal portion of the gangway of FIG. 1.

Referring now to FIG. 2, certain additional details of support structure 14 can be most easily explained. In this embodiment, a respective bearing retainer plate 54 is attached to the outside surface of the main side plate of support structure 14. As shown, bearing 20 is located in the aperture 56 through which rod 22 extends. Bearing retainer plate 54 comprises a piece 58 of sheet metal which carries foot lock stud 50 and an over-travel stop bracket 60. Retainer plate 54 is attached to the main side plate of support structure 14 utilizing a plurality of rivets (e.g., rivet 62) that extend through respective apertures defined in retainer plate 54. Three similar apertures 64a-c are spaced apart around aperture 56, but do not contain a rivet. As will be explained below, these apertures are utilized in the present embodiment as part of a novel position locking assembly.

As shown, travel stop bracket 60 carries a bumper 66 which together form an over-travel stop assembly. One end of bumper 66 is preferably formed from rubber or other suitable shock-absorbing material. In operation, the over-travel stop assembly and, specifically, bumper 66 come into contact with upright 28 when gangway 10 and, specifically, support structure 14 and ramps 16 and 18 are moved into the upward, stowed position. That is, the over-travel stop assembly prevents the components of gangway that are not meant to come into contact from colliding with one another.

Figure 3:
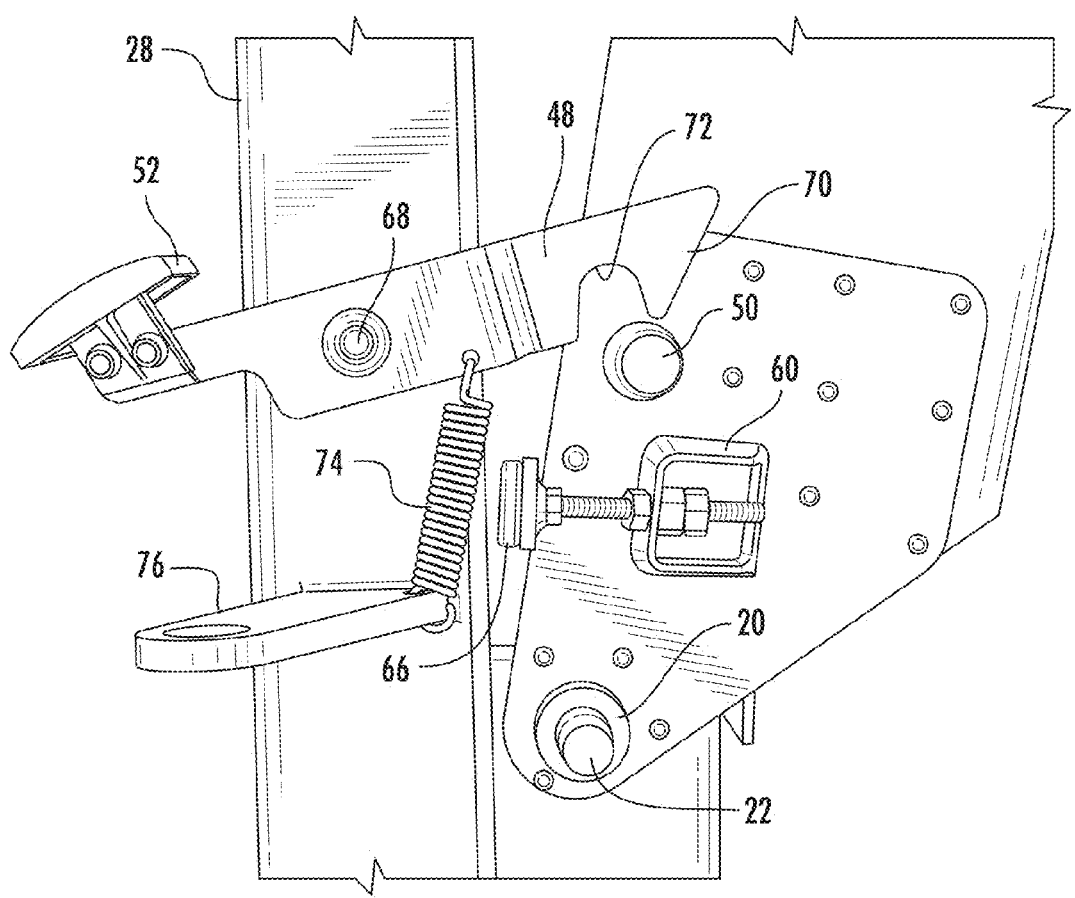
FIG. 3 is an enlarged elevational view showing operation of the foot lock of the gangway of FIG. 1.

Referring now to FIG. 3, the manner in which foot lock operates will be explained in greater detail. As can be seen, foot lock 48 is pivotally connected to upright 28 via a pivot 68 located near its midpoint so that foot lock 48 moves in seesaw fashion. The end of foot lock 48 opposite pedal 52 defines a slanted surface 70 forward of a notch 72. A spring 74 extends between foot lock 48 and a flange 76 (part of outrigger 42) to urge this side of foot lock 48 in the downward direction. A user pushes pedal 52 against the force of spring 74 when it is desired to move support structure 14 into the stowed position. In this regard, slanted surface 70 helps foot lock 48 ride over stud 50 until it is aligned with notch 72. The user then releases pedal 52 to that spring 74 will move notch 72 into a locked position maintaining engagement of foot lock 48 with stud 50.

In operation, support structure 14, first ramp 16, and telescoping ramp 18 pivot relative to fixed portion 12 so that gangway 10 may be lowered in order to position the end of the ramp adjacent to the relevant container. Telescoping ramp 18 may then be moved so as to extend from first ramp 16 to a desired position to span any gap between ramp 16 and the storage container. Pivotal arm 24 is then used to secure telescoping ramp 18 relative to first ramp 16 in order to maintain telescoping ramp 18 in a fixed position. For example, pivotal arm 24 may have a transverse pin at its distal end (near handle 26) which is inserted through a selected hole defined in upright 30. The user may hold handle 26 of arm 24 in order to facilitate extension and retraction of telescoping ramp 18.

As noted, gangway 10 may be stowed when not use by rotating support structure 14 such that support structure 14 (and ramps 16 and 18) to an upward (i.e., generally vertical) position, as described above. In a preferred embodiment, the counterbalanced springs connected between uprights 28 and the distal end of support structure 14 assist rotation of the support structure and ramps with respect to fixed portion 12.

Figure 4:
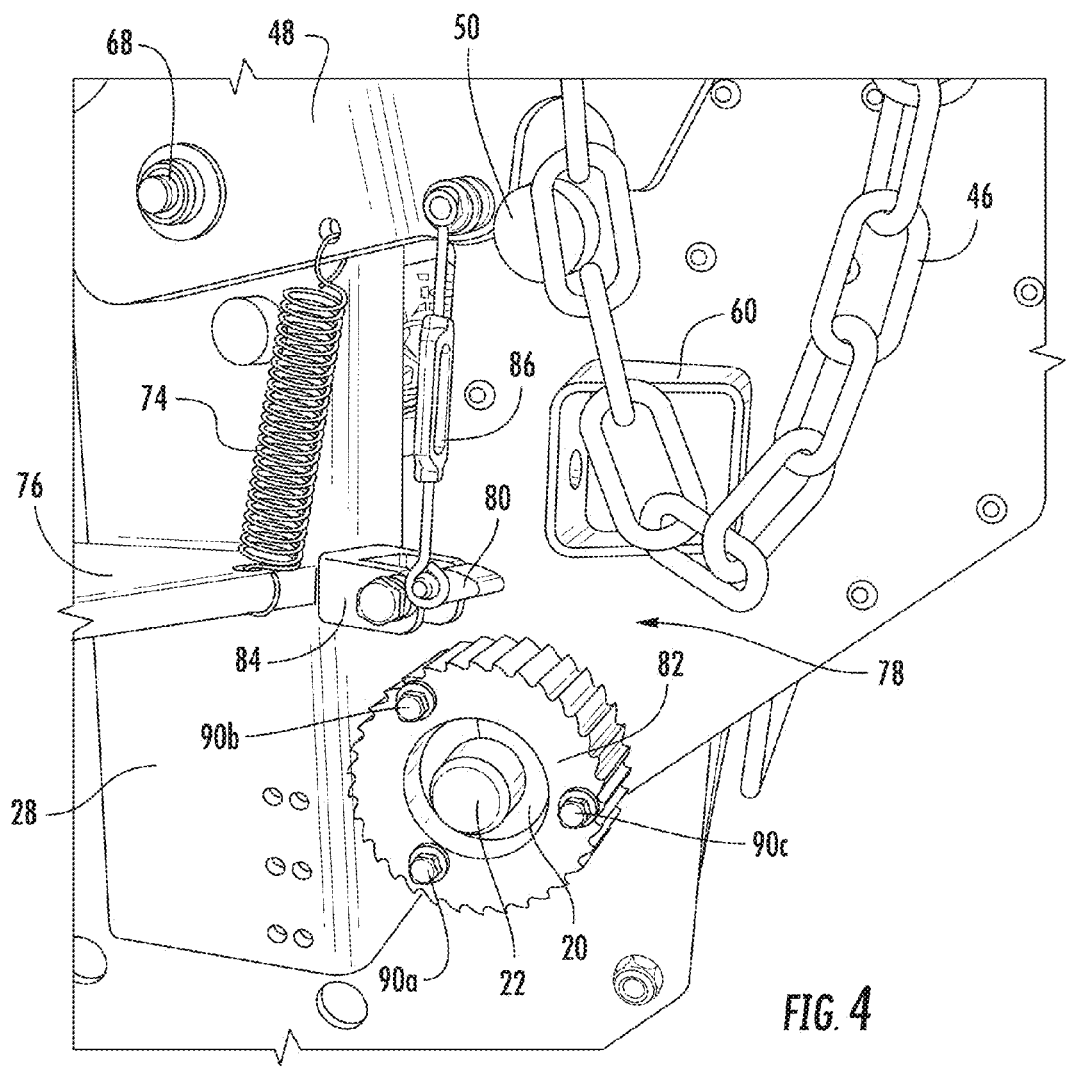
FIG. 4 is an enlarged perspective view of the pivotal portion of the gangway of FIG. 1 showing one embodiment of a position locking assembly in accordance with the present invention.
Figure 5:
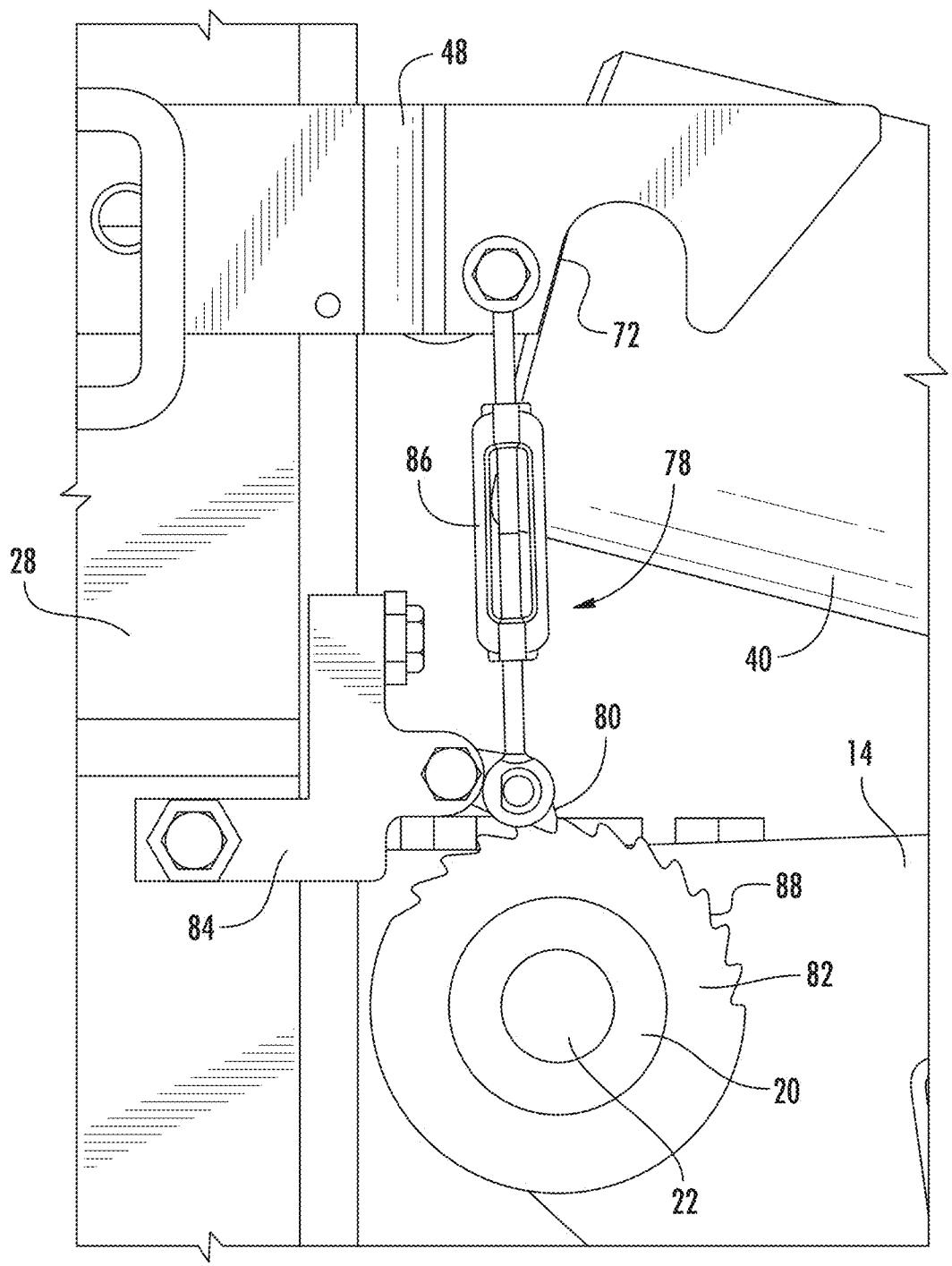
FIG. 5 is an enlarged elevational view showing operation of the position locking assembly of FIG. 4.

Referring now to FIGS. 4 and 5, a gangway position locking assembly 78 in accordance with an embodiment of the present invention will be described. As stated above, heavy duty chains may be used to prevent further downward movement of the support structure 14 once the desired position adjacent a storage container is reached. Such chains, however, do not prevent the user from slightly raising the support structure 14 against operational instructions. Because of the counterbalanced springs, support structure 14 will tend to remain in this slightly raised position unless it is then carrying additional weight (such as a person standing on it). In certain circumstances, the slightly raised support structure can yield undesirable results.

In this regard, position locking assembly 78 in accordance with the illustrated embodiment is configured to prevent any upward movement of support structure 14 unless the user acts to bring support structure 14 (and thus ramps 16 and 18) to the stowed position. For example, in the illustrated embodiment, release of the locking mechanism occurs when the end of foot lock 48 carrying notch 70 is raised, such as by pressing down on foot pedal 52. At other times, spring 74 pulls down on foot lock 48, which also facilitates maintaining locking assembly 78 in the locked position.

Locking assembly 78, in the illustrated embodiment, comprises a ratchet mechanism including a pawl 80 and an arcuate ratchet here in the form of ratchet wheel 82. As shown, pawl 80 is pivotally connected to upright 28 at bracket 84. A linkage 86 interconnects pawl 80 to foot lock 48 at a location just inside of notch 72. Thus, when foot lock 48 is raised as shown in FIG. 4, pawl 80 moves out of engagement with ratchet wheel 82. Otherwise, spring 74 maintains pawl 80 in engagement with ratchet wheel 82. One skilled in the art will appreciate that pawl 80 will ride over the teeth 88 of ratchet wheel 82 as support structure 14 is lowered into position (i.e., as support structure 14 is rotated with respect to fixed portion 12 in the clockwise direction). On the other hand, unless pawl 80 is pivoted out of the way by action of foot lock 48, teeth 88 will engage pawl 80 if any attempt is made to raise support structure 14 (i.e., rotate support structure 14 in the counter-clockwise direction). As a result, support structure 14 (and thus the ramps) will be maintained at the desired angular position unless the operator is standing on the main platform and intends to raise the ramp.

In this embodiment, ratchet wheel 82 is advantageously located coaxial with bearing 20 and rod 22. In particular, ratchet wheel defines an inner diameter slightly greater than the outer diameter of bearing 20 so that it can be received around bearing 20, as shown. Racthet wheel 80 may be attached to support structure 14 via elongate fasteners (e.g., bolts 90a-c) that extend through respective holes 64a-c defined in support structure 14. Ratchet wheel 82 may be a unitary structure, or may comprise a plurality of stacked discs that together provide the desired width. Moreover, teeth 88 may be defined around the entire circumference of ratchet wheel 82 (as shown in FIG. 4), or only around the working segment of ratchet wheel 82 (as shown in FIG. 5) since the angular range through which support structure 14 moves is limited. Alternatively, the ratchet itself may be formed as an arc segment rather than a wheel.

In operation, gangway 10 is positioned adjacent or over a container either by a fixed structure or by a mobile access unit. If the support structure 14 is in the stowed position, a user depresses pedal 52 in order to raise foot lock 48, thereby releasing foot lock stud 50. Once foot lock stud 50 is cleared, the user releases pedal 52. The gangway's support structure 14 can then be rotated with respect to fixed portion 12 to a desired angular position. As the support structure 14 is lowered in this manner, pawl 80 rides over the teeth 88 of ratchet wheel 82. Unless foot lock 48 is again raised, pawl 80 will prevent subsequent raising of support structure 14.

When not in use, the user may retract support structure 14 by depressing pedal 52. This releases pawl 80 and raises notch 72 to more easily receive foot lock stud 50. A pulling force is applied to components of the gangway, e.g., chain 46, to rotate support structure 14 into an upward position. Once stud 50 and notch 72 are aligned, the user releases pedal 52 to capture stud 50. This maintains gangway 10 in the stowed position until again needed for use.

Those skilled in the art should appreciate that the above description provides a gangway having a novel position locking assembly. While one or more preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A gangway comprising:
   a fixed platform;
   a support structure connected to the fixed platform in a manner that allows the support structure to rotate with respect to the fixed platform between a stowed position and a lowered position; and
   a releasable position locking assembly actuatable between a locked state and an unlocked state such that when in the locked state, the releasable position locking assembly inhibits rotation of said support structure in a raising direction from the lowered position toward the stowed position, and, when in the unlocked state, permits the rotation;
   wherein the position locking assembly comprises a release actuator disposed so that actuation thereof by an operator at the fixed platform causes the releasable position locking assembly to be in the unlocked state.

2. The gangway of claim 1, wherein said releasable position locking assembly, when in the locked state, permits rotation of the support structure in a lowering direction.

3. The gangway of claim 2, further comprising a pedal-actuated foot lock for maintaining said support structure in the stowed position, said release actuator comprising said foot lock, and said position locking assembly being released upon actuation of said foot lock.

4. The gangway of claim 2, wherein said position locking assembly comprises a pawl that engages an arcuate ratchet.

5. The gangway of claim 4, wherein engagement of the pawl and the arcuate ratchet when the gangway is in the lowered position will prevent raising of the gangway.

6. The gangway of claim 4, wherein the pawl is urged into engagement with the arcuate ratchet via a spring.

7. The gangway of claim 6, wherein said spring is connected between a fixed structure and a pivotal foot lock.

8. The gangway of claim 7, wherein said pawl is connected to said pivotal foot lock via a linkage.

9. The gangway of claim 7, wherein disengagement of the pawl and the arcuate ratchet occurs while activating the foot lock from the fixed platform.

10. The gangway of claim 4, wherein the arcuate ratchet comprises a ratchet wheel coaxial with an axis of rotation of said support structure.

11. The gangway of claim 10, wherein said ratchet wheel is located around a bearing.

12. A releasable position locking assembly for a gangway having a support structure pivotal with respect to a platform about an axis of rotation between a stowed position and a lowered position, said assembly comprising:
   a ratchet wheel coaxial with the axis of rotation of the support structure;
   a pawl that engages teeth located on an outer circumference of said ratchet wheel so as to inhibit rotation of said support structure in a raising direction from the lowered position toward the stowed position but permitting rotation of the support structure in a lowering direction;

said pawl being movable out of engagement with said teeth so as to permit rotation of said support structure in a raising direction; and a release actuator configured to be actuated by an operator at the platform to cause said pawl to be moved out of engagement with said teeth.

13. The releasable position locking assembly of claim 12, wherein said teeth extend partially around the circumference of said ratchet wheel.

14. The releasable position locking assembly of claim 12, wherein said teeth extend entirely around the circumference of said ratchet wheel.

15. The releasable position locking assembly of claim 12, wherein said ratchet wheel is located around a bearing.

16. The releasable position locking assembly of claim 12, wherein the pawl is urged into engagement with the ratchet wheel via a spring and moved out of engagement with the ratchet wheel against the force of said spring.

17. The releasable position locking assembly of claim 16, wherein the pawl moves into and out of engagement with the ratchet wheel via pivotal movement.

18. The releasable position locking assembly of claim 17, wherein the release actuator comprises a pivotal actuator connected to said pawl via a linkage, movement of the pivotal actuator causing pivotal movement of pawl.

19. The releasable position locking assembly of claim 18, wherein said spring comprises a helical spring.

20. The releasable position locking assembly of claim 19, wherein said linkage and said spring are located on a same side of a pivot of said pivotal actuator.

21. The releasable position locking assembly of claim 18, wherein said pivotal actuator comprises a pedal-actuated foot lock for maintaining the support structure in the stowed position, said pawl moving out of engagement with the ratchet wheel upon actuation of said foot lock.

22. A releasable position locking assembly for a gangway having a support structure pivotal with respect to a platform about an axis of rotation between a stowed position and a lowered position, said assembly comprising:

a ratchet situated adjacent to the axis of rotation of the support structure;

a pawl that engages teeth located on said ratchet so as to inhibit rotation of said support structure in a raising direction from the lowered position toward the stowed position but permitting rotation of the support structure in a lowering direction;

said pawl being movable out of engagement with said teeth so as to permit rotation of said support structure in a raising direction; and a release actuator configured to be actuated by an operator at the platform to cause said pawl to be moved out of engagement with said teeth.

\* \* \* \* \*